United States Patent Office

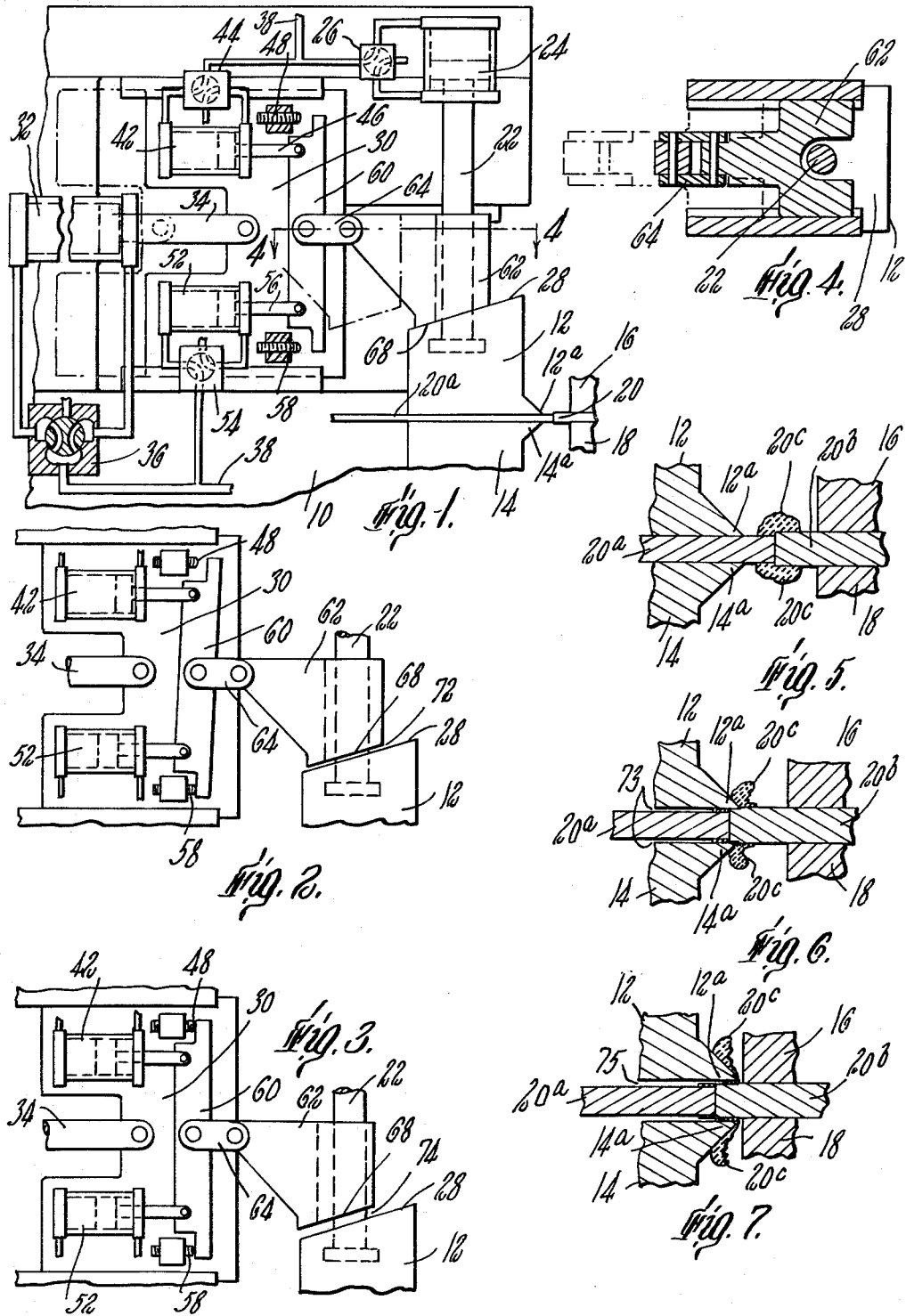

3,036,202
Patented May 22, 1962

3,036,202
FLASH REMOVING WELDING MACHINE
Hermann W. Stieglitz, Marblehead, Walter S. Kaiser, Wakefield, and Charles D. Moore, Byfield, Mass., assignors to Seton Corporation, Providence, R.I., a corporation of Delaware
Filed May 3, 1960, Ser. No. 26,466
11 Claims. (Cl. 219—97)

This invention relates to flash butt welding machines of the type incorporating means for removing the flash or upset metal produced by the welding operation. More particularly, it relates to such machines wherein the flash or upset metal is removed in one or more successive steps to a predetermined distance from the surface of the welded work without adjustment to accommodate varying workpiece thicknesses.

In Patent No. 2,875,319 is shown and described a welding machine wherein the clamping mechanism having the shearing mechanism associated with it will be opened automatically a predetermined distance while maintaining clamping pressure on the other clamping mechanism, the clamping mechanisms thereafter being further advanced toward one another to shear or otherwise remove the "flash" or upset metal from the weld. Such mechanism is entirely satisfactory for use with workpieces of uniform thickness, since, once the predetermined shearing opening between the shearing clamp mechanism is adjusted to provide a desired depth of flash removal, that is, excess of overall sheared upset thickness over workpiece thickness, such excess will remain uniform so long as the workpiece thickness remains uniform. In the case of workpieces wherein the thickness in the direction between the workpiece clamping surfaces is not uniform from piece to piece, and especially when a workpiece of one thickness is to be welded to a workpiece of a substantially different thickness, the apparatus of Patent No. 2,875,319 is not entirely satisfactory because of the necessity of adjusting for each weld, which is impractical in a production operation, or of adjusting for maximum workpiece thickness, which tends to leave an undesirable excess of flash or upset metal on the thinner workpieces requiring excessive grinding or other finishing operations.

It is an object of the present invention to provide novel self-adjusting shearing clamp means for shearing workpieces of varying thickness to a desired depth of flash removal and to do so in two successive steps if desired as is especially useful in removing the upset from the weld area of two workpieces of considerably different thickness. According to the present invention, this object is accomplished by providing, in addition to a movable clamp means having power operating means therefor, a stop means for said clamp means and control means for the stop means effective to establish a predetermined clearance between the clamp means and the stop means for opening the clamp means a predetermined distance beyond its clamped position. More specifically, said stop means includes a movably mounted supporting member with a stop member movably mounted thereon, both operated by suitable power means. With this apparatus the supporting member is first advanced to move the stop member into contact with the clamp means in its clamped position. The stop member is then retracted a desired predetermined distance while the supporting member remains stationary, establishing a predetermined clearance between the stop member and clamp means so that the latter may be opened a predetermined distance beyond its clamped distance to establish a desired degree of flash removal regardless of workpiece thickness. If desired, similar means may also be provided for retracting the clamp means an additional predetermined distance as is useful in shearing welds between workpieces of differing thickness.

For establishing the desired predetermined shearing openings of the clamp means to the desired degree of accuracy, the present invention also provides as a stop means a wedge surface member which may move in a direction generally perpendicular to that of the cooperating wedge surface provided on the movable clamp means, such stop means wedge surface member being retractable to a position clear of the clamp means for opening the clamp means beyond the predetermined distance established by the stop means so that workpieces may be readily inserted and removed from the clamp means.

For the purpose of fully describing further objects and features of the invention, reference is now made to the following description of a preferred embodiment thereof, together with the accompanying drawings, wherein:

FIG. 1 is a somewhat diagrammatic front elevation of the preferred embodiment of the welding machine of the present invention, shown with the shearing clamp in clamped position and the stop means in contact therewith;

FIG. 2 is a partial front elevation of the machine of FIG. 1 but showing the stop means retracted a first predetermined distance while the shearing clamp remains in clamped position;

FIG. 3 is a partial front elevation of the machine of FIG. 1 but showing the stop means retracted an additional predetermined distance;

FIG. 4 is a partial cross-section taken on the line 4—4 of FIG. 1, and

FIGS. 5–7 are diagrammatic cross-sections showing the operation of the machine of FIG. 1 to shear and remove the upset metal from a weld in two successive shearing steps.

Referring to FIGS. 1 and 4, the welding machine has a base upon which are mounted an insulated fixed platen 10 and an insulated movable platen (not shown) supplied with welding current and moved toward and away from one another by any suitable means such as are shown in Patent No. 2,875,319. Each of the platens has a clamping structure consisting of a fixed platen upper jaw 12 and lower jaw 14 and a movable platen upper jaw 16 and lower jaw 18 for clamping work 20 to be welded, the separate workpieces herein being designated 20a and 20b and the upset or flash metal thereon being designated 20c. The jaws of the fixed platen clamping structure include shearing portions 12a and 14a which are adapted to remove upset metal from the area of the weld. The fixed platen upper jaw is mounted for vertical movement on the lower end of the piston rod 22 of a double acting hydraulic power cylinder 24 having an operating valve 26 for suitably connecting said cylinder to a source of fluid pressure 38 and to an exhaust for moving it between a clamped or unclamped position. A wedge surface portion 28 is provided at the upper side of said upper jaw 12.

According to the present invention, the stop means cooperating with said wedge surface portion 28 to establish the predetermined clearances for shearing includes a supporting slide or member 30 mounted for sliding movement on platen 10 in a direction perpendicular to the movement of upper jaw 12. For advancing slide 30 into operative position as shown in solid lines in FIG. 1 and for retracting it into inoperative position, a double-acting hydraulic power cylinder 32 is provided, said cylinder being mounted on platen 10 and having its piston rod 34 connected to slide 30. For operating cylinder 32, a three position valve 36 is utilized so that piston rod 34 may be urged into its advanced or its retracted position by respectively connecting its rearward or forward side to a source of fluid pressure at 38 and the opposite side to exhaust, or so that the piston rod 34 may be locked in position to hold slide 30 in stationary position, by simultaneously connecting both sides thereof to the source of high pressure 38 as is shown in FIG. 1.

In order to provide for two successive predetermined depths of upset removal, a pair of double acting hydraulic cylinders 42, 52 are mounted on slide 30 parallel to but spaced from one another generally in the direction of movement of clamp piston rod 22. Each of said cylinders has an operating valve 44, 54 for connecting one of its sides to a source of fluid pressure 38 to move its piston rod 46, 56. The free ends of said piston rods are connected by a rocking bar 60 which extends therebeyond into a position to be engaged by an adjusting screw 48, 58 mounted on slide 30 for determining the rearward extent of movement of the cooperating end of rocking bar 60. A stop member 62 having a wedge surface portion 68 cooperating with that surface 28 of upper jaw 12 is slideably mounted in platen 10 for movement in a direction perpendicular to that of upper jaw 12 and is connected to rocking bar 60 by a link 64 so that it will be moved by movement of said rocking bar as urged by cylinders 42, 52 or by movement of slide 30 as urged by cylinder 32.

In operation, the workpieces 20a and 20b of differing thicknesses are clamped in clamps 12, 14 and 16, 18 respectively and the clamps advanced toward one another to weld the workpieces together in the usual manner, producing "flash" or upset metal 20c as appears in FIG. 5. In accordance with the principles of the present invention, the stop member 62, before beginning the shearing action of the machine and while the clamps 12, 14 still hold the workpiece 20a, is advanced by means of valve 36 and cylinder 32 until its wedge surface 68 is in firm pressure contact with the parallel wedge surface 28 of upper jaw 12 and slide 30 is then locked in that position by connecting both ends of cylinder 32 to the source of high pressure 38 through valve 36, cylinders 42, 52 being in their predetermined furthest advanced position with their pistons in contact with the forward end of cylinders 42, 52 because of their rearward ends being connected to the source of high pressure 38, all as shown in FIG. 1. In order to establish the first predetermined distance for the initial shearing step, cylinder 52 is operated to move its end of rocking bar 60 rearwardly into contact with adjusting screw 58. This will establish a clearance 72 between surfaces 28 and 68, such clearance being adjustable by screw 58 (FIG. 2). Upon retraction of upper jaw 12 by its cylinder 24 and valve 26, clearance 72 will be taken up to provide a predetermined spacing 73 from the workpiece 20a; the clamps 12, 14 and 16, 18 then being advanced toward one another for a distance equal to or just short of the width of upset metal 20c closely to shear the upset metal 20c from workpiece 20a (FIG. 6). Means for so advancing the clamps, being fully shown and described in Patent No. 2,875,319, need not be described herein. To accomplish the final shearing and upset removal step, the jaws 12, 14 are opened for a further predetermined distance 75 by operating cylinder 42 to move its end of rocking bar 60 rearwardly into contact with adjusting screw 48 to establish a larger clearance 74 between surfaces 28 and 68 (FIG. 3). Further shearing advance of the clamps will then completely remove the upset metal 20c from workpiece 20b as well, even though it is of greater thickness than is 20a and without digging in below its surface.

It will be apparent to those skilled in the art that various modifications may be made within the spirit of the invention and the scope of the appended claims, for example, the preferred apparatus may be readily simplified to provide for but a single depth of flash removal but still irregardless of workpiece thickness.

We claim:

1. Apparatus for flash butt welding and shearing flash metal from the weld area including clamp means having power operating means therefor and an operating surface, stop means for said clamp means including an operating surface and control means for establishing a predetermined clearance between said operating surfaces for opening said movable clamp means a predetermined distance beyond its clamped distance.

2. Apparatus as claimed in claim 1 wherein said control means includes first operating means for moving said stop means operating surface into contact with said clamp means operating surface and second operating means for retracting said stop means a predetermined distance from said clamp means while said first operating means remains in locked position.

3. Apparatus as claimed in claim 2 further including third operating means for retracting said stop means operating surface an additional predetermined distance from said clamp means operating surface while said first and second operating means remain in locked position.

4. Apparatus for flash butt welding and shearing flash metal from the weld area including clamp means having power operating means therefor and a wedge surface at an angle to the direction of movement thereof, stop means for said clamp means including a wedge surface cooperating with said movable clamp means wedge surface and control means for establishing a predetermined clearance between said wedge surfaces for opening said clamp means a predetermined distance beyond its clamped distance.

5. Apparatus as claimed in claim 4 wherein said control means includes first operating means for moving said stop means wedge surface into contact with said clamp means wedge surface and second operating means for retracting said stop means wedge surface a predetermined distance from said clamp means wedge surface while said first operating means remains in locked position.

6. Apparatus as claimed in claim 5 further including third operating means for retracting said stop means wedge surface an additional distance from said clamp means wedge surface while said first and second operating means remain in locked position.

7. Apparatus for flash butt welding and shearing flash metal from the weld area including clamp means having power operating means therefor and an operating surface, stop means for said clamp means including a movably mounted supporting member, and a stop member movably mounted on said supporting member and having an operating surface, and power control means for said supporting member and said stop member for first advancing said supporting member to move said stop member into contact with said clamp means and then retracting said stop member a predetermined distance while said supporting member remains stationary establishing a predetermined clearance between said operating surfaces for opening said clamp means a predetermined distance beyond its clamped distance.

8. Apparatus as claimed in claim 7 wherein said control means includes first power operating means for moving said stop member into contact with said clamp means and second power operating means for retracting said stop member a predetermined distance from said clamp means while said first power operating means remains in locked position.

9. Apparatus as claimed in claim 2 further including third power operating means for retracting said stop member an additional predetermined distance from said clamp means while said first and second power operating means remain in locked position.

10. Apparatus for flash butt welding and shearing flash metal from the weld area including clamp means having power operating means therefor and a wedge surface at an angle to the direction of movement thereof, stop means for said clamp means including a movably mounted supporting member, and a stop member movably mounted on said supporting member, said stop member having a wedge surface cooperating with said clamp means wedge surface and power control means for said supporting member and said stop member including first power operating means for first advancing said supporting member to move stop means wedge surface into contact with said clamp means wedge surface and second power operating means for retracting said stop means wedge surface a predetermined distance from said clamp means wedge surface while said first power operating means remains in locked position, said stop member wedge surface being movable upon retraction of said power operating means to a position clear of said clamp means wedge surface for opening of said clamp means beyond said predetermined clearance.

11. Apparatus for flash butt welding and shearing flash metal from the weld area including clamp means having power operating means therefor and a wedge surface at an angle to the direction of movement thereof, stop means for said clamp means including a movably mounted supporting member movable in a direction generally perpendicular to that of said clamp means, and a stop member movably mounted on said supporting member, said stop member having a wedge surface member cooperating with said clamp means wedge surface and power control means for said supporting member and said stop member including first hydraulic power operating means having a movable element connected to said supporting member for moving said supporting member, second and third hydraulic power operating means each having a movable element, link means connected generally transversely between said second and third power operating means movable elements, and connecting means connecting said clamp means wedge surface member to said link means generally centrally thereof, said first hydraulic power means operating for first advancing said supporting member to move said stop means wedge surface member into contact with said clamp means wedge surface and said second and third hydraulic power operating means then retracting said stop member successive predetermined distances while said supporting member remains stationary establishing successive predetermined clearances between said wedge surfaces for opening said clamp means predetermined distances, said member wedge surface member being movable upon retraction of said first power operating means to a position clear of said clamp means beyond said predetermined clearances.

References Cited in the file of this patent

UNITED STATES PATENTS 2,875,319    Stieglitz _____ Feb. 24, 1959